3,454,613
GLYCYRRHETIC ACID PHOSPHORIC ACID ESTER AND SALTS THEREOF

Dahlia S. Greidinger, Haifa, and Liuba Gershowitch-Cohen, Kiriat Motzkin, Israel, assignors to Chemicals & Phosphates Ltd., Haifa Bay, near Ir Ganim, Israel, an Israeli company
No Drawing. Filed July 15, 1966, Ser. No. 565,392
Claims priority, application Israel, Aug. 8, 1965, 24,113
Int. Cl. C07f 9/02; A61k 27/00
U.S. Cl. 260—447                    10 Claims

ABSTRACT OF THE DISCLOSURE

A novel glycyrrhetic acid phosphoric acid ester having a molecule of phosphoric acid connected in ester bond to an hydroxy group of a molecule of glycyrrhetic acid is obtained by reacting an excess of phosphoric acid in the presence of urea at a temperature of about 130–170° C. to form a glycyrrhetic acid phosphoric acid ester ammonium salt, the latter of which is decomposed by treatment with an acid to precipitate the free ester. The said ester is useful for therapeutic purposes such as in suppressing inflammations.

---

This invention provides a new derivative of glycyrrhetic acid, being a phosphoric acid ester in which one molecule of phosphoric acid is connected in ester bond to one hydroxy group of glycyrrhetic acid, and salts thereof.

It is assumed that the esterification with phosphoric acid occurs in the 3-position of the glycyrrhetic acid molecule.

The formation of salts of the new glycyrrhetic acid phosphoric acid ester can occur in the carboxyl group of the glycyrrhetic acid moiety and in the two unoccupied acid functions of the phosphoric acid moiety.

Glycyrrhetic acid and some of its derivatives, e.g., glycyrrhetic acid hydrogen succinate and its salts, and N,N-dialkylamino alkanol esters of glycyrrhetic acid, are known to have a pronounced effect in suppressing inflammations, and their use for therapeutic purposes is desirable. However, the known free acid is very little soluble in water and the aqueous body fluids, and the solubility of the aforesaid known derivatives, though better than that of the acid, is still not satisfactory. Their applicability has, therefore, been rather limited up to now. Moreover, the stability of the known derivatives aforesaid under hydrolytic conditions is insufficient.

Some salts of the new glycyrrhetic acid phosphoric acid ester according to the present invention are readily water-soluble, especially the alkali metal and ammonium salts thereof, but even the free ester has a greatly improved solubility, as compared with the free acid and its known derivatives. The stability to hydrolytic influences is greatly superior to that of the known derivatives.

The new glycyrrhetic acid derivatives according to the invention are therefore much more suitable for systemic use than the hitherto known derivatives of this acid.

The invention also provides a process for the preparation of the new glycyrrhetic acid phosphoric acid ester, wherein glycyrrhetic acid is reacted with a larger excess of phosphoric acid in the presence of a large amount of urea at a temperature above 100° C., e.g., in the range of 130–170° C., preferably 140–160° C.

This reaction produces the ammonium salt of the glycyrrhetic acid phosphoric acid ester, and this can be converted into the free ester from which other salts can be prepared.

It has been found advisable to use as much as 17–25 molecular amounts of phosphoric acid and 100 to 150 molecular amounts of urea for each molecular amount of glycyrrhetic acid. With such proportions of the reactants, yields of 70–90%, calculated on the weight of the glycyrrhetic acid used as starting material, have been achieved. Lower ratios of phosphoric acid and urea can be used but in that case the yield will be lower. In any case the unreacted glycyrrhetic acid can be used again as a starting material, and in the end the yield is, therefore, about 100%.

The time required for the reaction to be completed may vary from 30 minutes to 8 hours. One of the factors determining the required time is the reaction temperature, the required time being the shorter the higher the temperature. In the preferred temperature range of 140–160° C., a reaction time of from 2–4 hours will as a rule be sufficient.

The invention is illustrated by the following examples to which it is not limited.

EXAMPLE 1

1.2 gram of glycyrrhetic acid was ground with 6.4 g. of 85%-by-weight phosphoric acid and 21.6 g. of urea to form a uniform paste. The amount of urea corresponded to 150 molecular parts and that of the phosphoric acid to 25 molecular parts, calculated on the glycyrrhetic acid.

The paste was dried and then kept for 2 to 3 hours at a temperature of 140–150° C. at which it was molten. The melt was stirred from time to time. During the last hour of the reaction time aforesaid the heating was effected under a reduced pressure of 100 mm. Hg.

After the termination of the reaction in the heat the product was allowed to cool, then taken up in 70 ml. of water which dissolved the ammonium salt of glycyrrhetic acid phosphoric acid ester formed by the reaction while some unreacted glycyrrhetic acid remained undissolved. The pH of the solution was adjusted to about 5 by the addition of a small amount of hydrochloric acid, then the solution was freed by filtration from unreacted glycyrrhetic acid. The latter amounted to about 0.25 g., i.e., about 20% of the quantity used as starting material. As a rule, from about 10 to about 25% of the glycyrrhetic acid remains unreacted.

The filtrate was admixed with so much concentrated aqueous hydrochloric acid that free glycyrrhetic acid phosphoric acid ester was precipitated. The precipitate was recovered by filtration and washed with 5–7% by weight aqueous hydrochloric acid. The crude product was then dissolved in 10% by weight aqueous potassium hydroxide, the solution was refluxed for 5 to 10 hours and then acidified with hydrochloric acid, the precipitated pure glycyrrhetic acid phosphoric acid ester was filtered, washed and dried in vacuo at a low temperature (about 40–50° C.) for the removal of water and residual hydrochloric acid.

EXAMPLE 2

1 gram of the free glycyrrhetic acid phosphoric acid ester prepared in accordance with Example 1 was dissolved in 20 ml. of dilute aqueous sodium hydroxide solution containing 0.22 g. (3 equivalents) of NaOH. The clear solution was then evaporated to dryness. The sodium salt thus obtained was colored a light tan and readily water soluble.

EXAMPLE 3

6.2 grams of the sodium salt of the glycyrrhetic acid phosphoric acid ester prepared in accordance with Example 2 was dissolved in 60 ml. of water and a concentrated aqueous solution of 3.4 g. of aluminum sulfate was added. The difficultly soluble aluminum salt of glycyrrhetic acid phosphoric acid ester was thereby precipitated. It was recovered by filtration, and dried.

EXAMPLE 4

Instead of proceeding as described in Example 3, the aluminum salt is precipitated by the addition of aluminum sulfate from the solution of the ammonium salt of the glycyrrhetic acid phosphoric acid ester which is an intermediate in the process described in Example 1 and, as described there, has been freed from unreacted glycyrrhetic acid.

In a manner analogous to Example 3 or 4, other difficultly soluble salts of the glycyrrhetic acid phosphoric acid ester can be prepared, e.g., the magnesium, calcium and bismuth salts.

The new compounds according to the invention have a good effect in suppressing inflammation and may be used in compositions with known additives to form, for example, ointments, powders, or emulsions. Furthermore, the water-soluble new compounds may be dissolved in suitable solvents, such as water, normal saline or oils to make compositions suitable for oral, subcutaneous, intramuscular, intraarticular, intraperitoneal and intravenous use. They are thus suitable for incorporation into ointments, solutions, injections, pastes, powders, etc.

The difficultly soluble salts are intended mainly for oral use.

We claim:

1. Glycyrrhetic acid phosphoric acid ester in which one molecule of phosphoric acid is connected in ester bond to one hydroxy group of one molecule of glycrrhetic acid, and salts thereof.

2. Glycyrrhetic acid phosphoric acid ester salts according to claim 1, being water-soluble alkali metal or ammonium salts.

3. Glycyrrhetic acid phosphoric acid ester salts according to claim 1, being difficultly water-soluble alkaline earth metal, aluminum and bismuth salts.

4. A process for the preparation of glycyrrhetic acid phosphoric acid ester in which one molecule of phosphoric acid is connected in ester bond to one hydroxy group of one molecule of glycyrrhetic acid comprising reacting glycyrrhetic acid with an excess of phosphoric acid in the presence of urea at a temperature above 100° C., decomposing the thus-formed glycyrrhetic acid phosphoric acid ester ammonium salt by treatment with an acid to form and precipitate the free ester, and recovering the latter from the reaction mixture.

5. A process according to claim 4, wherein 17 to 25 molecular amounts of phosphoric acid and 100 to 150 molecular amounts of urea are used as reactants for each molecular amount of glycyrrhetic acid.

6. A process according to claim 4, wherein the reaction of glycyrrhetic acid with phosphoric acid is effected at a temperature within the range from 130 to 170° C.

7. A process according to claim 4, wherein the reaction of glycyrrhetic acid with phosphoric acid is effected at a temperature within the range from 140 to 160° C.

8. A process according to claim 4, wherein the free glycyrrhetic acid phosphoric acid ester obtained by decomposition of its ammonium salt is purified by dissolution in aqueous alkali metal hydroxide and reprecipitation by acidulation of this solution.

9. A process for the preparation of an alkali metal salt of glycyrrhetic acid phosphoric acid ester, wherein the free ester is dissolved in an aqueous alkali metal hydroxide solution and the solution is evaporated for the recovery of an alkali metal salt of glycyrrhetic acid phosphoric acid ester.

10. A process according to claim 9, wherein the alkali metal hydroxide solution contains the calculated stoichiometrically required amount of alkali metal hydroxide corresponding to three equivalents for each equivalent of glycyrrhetic acid phosphoric acid ester.

References Cited

Goldstein: Chemical Abstracts (1960), vol. 54, p. 13416(g).

Seiden: Chemical Abstracts (1961), vol. 55, p. 2028.

Sontag: Chemical Abstracts (1961), vol. 55, p. 916(b).

TOBIAS E. LEVOW, *Primary Examiner.*

W. F. W. BELLAMY, *Assistant Examiner.*

U.S. Cl. X.R.

260—448, 941, 964; 424—214